W. H. CLARK.
GATE.
APPLICATION FILED JUNE 14, 1909.
935,588.
Patented Sept. 28, 1909.
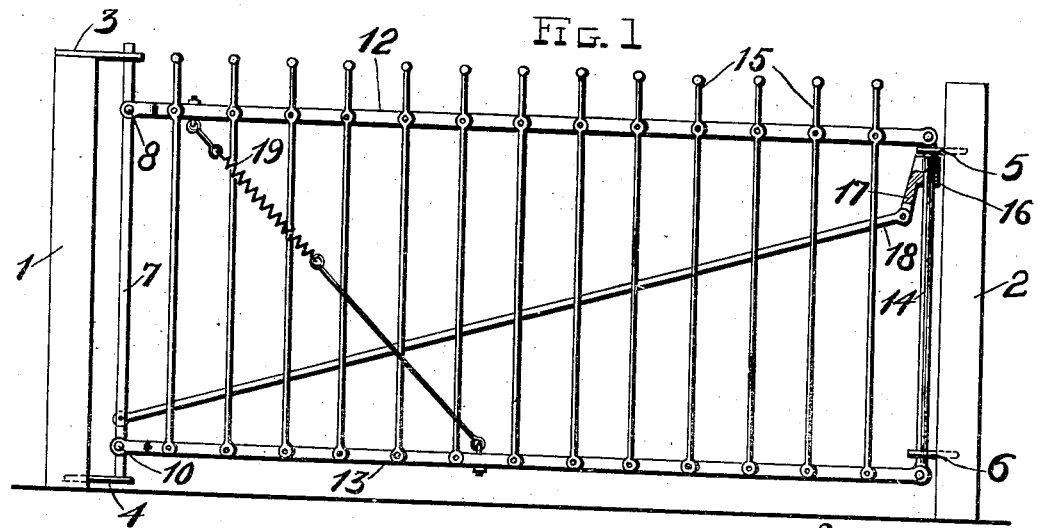
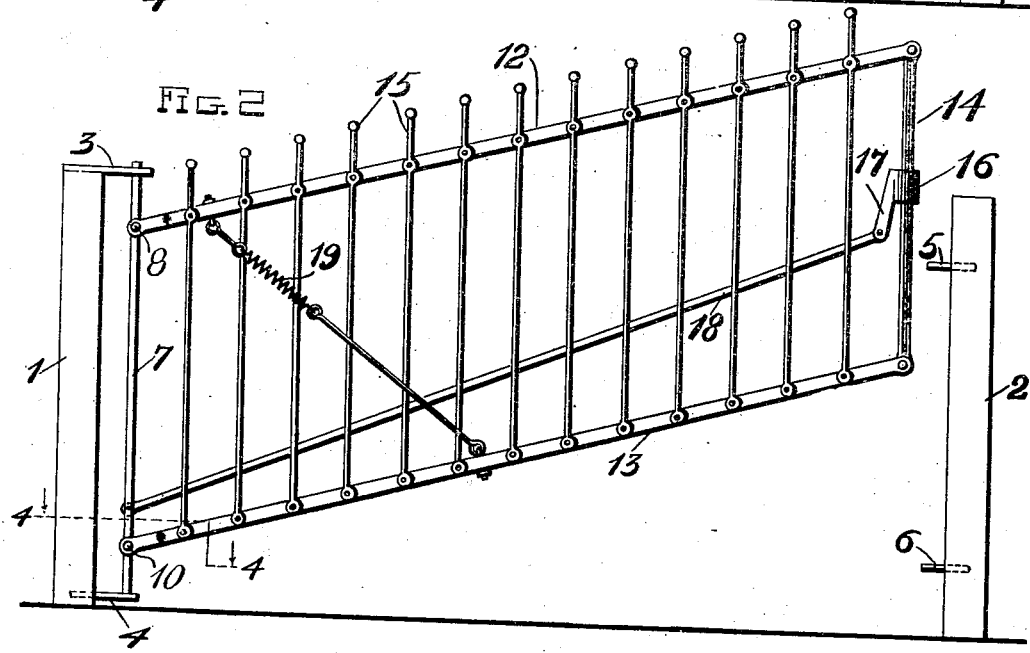
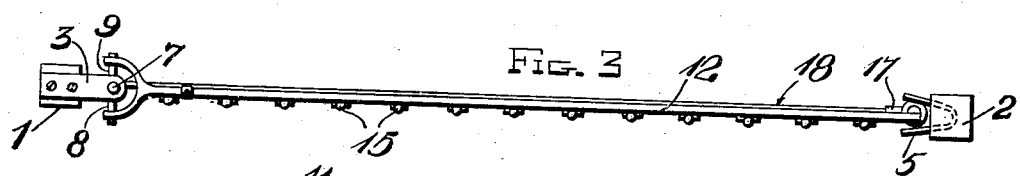
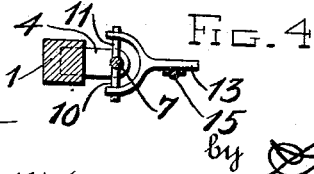
Witnesses
Inventor
W. H. Clark.
by  Attorneys

UNITED STATES PATENT OFFICE.

WILLIAM H. CLARK, OF ELK CITY, OKLAHOMA.

GATE.

935,588.  Specification of Letters Patent.  Patented Sept. 28, 1909.

Application filed June 14, 1909. Serial No. 502,050.

*To all whom it may concern:*

Be it known that I, WILLIAM H. CLARK, a citizen of the United States, residing at Elk City, in the county of Beckham and State of Oklahoma, have invented certain new and useful Improvements in Gates; and I do declare the following to be a full, clear, and exact description of the invention, such as will enable others skilled in the art to which it appertains to make and use the same.

This invention relates to improvements in gates adapted to swing in a horizontal plane.

The object thereof is to provide a simply constructed and efficient gate which may be used either as a farm, a lawn or garden gate, and constructed to provide for the raising and lowering of its front end to open and close the gate.

With this and other objects in view, the invention consists of certain novel features of construction, combination and arrangement of parts, as will be more fully described and particularly pointed out in the appended claims.

In the accompanying drawings, Figure 1 is a side elevation of a gate constructed in accordance with this invention in closed position. Fig. 2 is a similar view showing the front end of the gate in raised position ready to be opened. Fig. 3 is a top plan view thereof showing the gate in closed position. Fig. 4 is a detail transverse section taken on line 4—4 of Fig. 2.

In the embodiment illustrated two gate posts, 1 and 2, are shown provided with laterally extending bearing plates, 3 and 4, to receive the rear upright of the gate as hereinafter described. The front post 2, is provided with longitudinally spaced forked keepers, 5 and 6, adapted to receive the front upright of the gate and hold it in closed position.

The gate shown is preferably constructed of angle or pipe iron and comprises a rear upright, 7, provided near its upper and lower ends with laterally extending arms, 8 and 9, and 10 and 11 respectively, which are adapted to form pivots for the upper and lower bars, 12 and 13, of the gate. These bars 12 and 13 have their rear ends bifurcated and provided with apertures to receive the free ends of the arms carried by the post or upright, 7, to provide for the vertical movement of said bars relative to said upright. The front upright, 14, is pivotally connected at opposite ends with the free ends of the upper and lower cross bars, 12 and 13, for a purpose to be described. In the form shown, pickets, as 15, are pivotally connected near their upper and lower ends to the cross bars, 12 and 13. A sleeve, 16, is slidably mounted on the front upright, 14, and is provided with a downwardly and inwardly inclined arm, 17, which is preferably bifurcated at its free end to receive one end of an operating lever, 18, the other end of which is pivotally connected to the rear upright, 7, near its lower end at a point slightly above the arms 10 and 11. An adjustable spring, 19, is secured at one end of the upper cross bar, 12, and is inclined outwardly toward the front of the gate and secured to the lower bar, 13, and is adapted to counterbalance the weight of the gate.

When the gate is in closed position as shown in Fig. 1, with the upright, 14, engaged by the keepers, 5 and 6, to open the gate the front end thereof is raised upwardly the upright 14, moving upward in the sleeve, 16, into the position shown in Fig. 2, whereby the front end is elevated, and the gate disengaged from the keepers and permitted to be swung into open position. When the gate has been elevated a sufficient distance to release it from said keepers, the weight thereof causes the sleeve, 16 to bind against the upright, 14, and hold said gate with its front end elevated as shown in Fig. 2. To close the gate it is swung horizontally into position until the front upright comes opposite the keepers, 5 and 6, when the sleeve, 16, is moved upwardly by elevating its arm, 17, which disengages the sleeve from the upright and permits the gate to move downwardly into position shown in Fig. 1 with its front upright disposed between the keepers, whereby it is held in closed position.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention:—

1. A gate comprising front and rear uprights, upper and lower cross bars pivotally connected at their opposite ends to said uprights, a sleeve slidably mounted on one of said uprights, and provided with a downwardly inclined arm, and a lever pivoted at one end to said arm and at its other end to the rear upright.

2. A gate composed of front and rear uprights, said rear upright having upper and lower arms extending laterally in opposite directions, upper and lower cross bars pivotally connected at one end to said front uprights and having their rear ends bifurcated and pivotally engaged with the arms of said rear upright, and means carried by the gate for locking the front end thereof in elevated position.

3. A gate comprising front and rear uprights upper and lower cross bars pivotally connected at their opposite ends to said uprights, a sleeve slidably mounted on said front upright and having a downwardly and inwardly inclined arm and a lever pivoted at one end to the free end of said arm and at its other end to said rear upright near the lower end thereof.

In testimony whereof I have hereunto set my hand in presence of two subscribing witnesses.

WILLIAM H. CLARK.

Witnesses:
JAMES A. ADRIAN,
JAMES A. HUBBARD.